United States Patent [19]

Hunkeler

[11] 3,768,917

[45] Oct. 30, 1973

[54] APPARATUS FOR CUTTING BLIND SLOTS
[75] Inventor: Ernst J. Hunkeler, Fairport, N.Y.
[73] Assignee: The Gleason Works, Rochester, N.Y.
[22] Filed: May 22, 1972
[21] Appl. No.: 255,853

Related U.S. Application Data
[63] Continuation-in-part of Ser. No. 194,311, Nov. 1, 1971, abandoned.

[52] U.S. Cl............................. 408/54, 90/31, 90/78, 90/92
[51] Int. Cl....................... B23b 41/12, B23b 47/18
[58] Field of Search ..................... 90/31, 78, 92, 95, 90/96; 408/14, 54

[56] References Cited
UNITED STATES PATENTS
3,143,923  8/1964  Krzyszczuk ............................. 90/31

FOREIGN PATENTS OR APPLICATIONS
1,269,455  5/1968  Germany ............................. 408/54
152,370  2/1962  U.S.S.R................................. 90/92

Primary Examiner—Francis S. Husar
Attorney—Morton A. Polster

[57] ABSTRACT

Apparatus for cutting "blind" arcuate slots in a workpiece, e.g., the seal slots required for the rotors of rotary combustion ("Wankel") engines. An access hole is drilled at the beginning and end of the proposed slot which is cut with a rotating cutter having cutting blades which are movable axially, relative to the face of the cutter, from a retracted non-cutting position to an extended cutting position. The blades rotate with the cutter and are "popped out" to their cutting position during their passage across the beginning access hole and, similarly, are retracted during their passage across the access hole at the slot end. In the preferred apparatus, extension and retraction of the cutter blades is controlled by a cam-and-hydraulic system which causes each successive blade to "pop out" the same predetermined distance, in-feed being accomplished by moving the entire cutting apparatus axially toward the workpiece until a full-depth position is reached. The cam-and-hydraulic system is specially designed to accomplish rapid blade movement and to suppress bouncing by blades "popped out" for cutting.

7 Claims, 6 Drawing Figures

Patented Oct. 30, 1973

APPARATUS FOR CUTTING BLIND SLOTS

This is a continuation-in-part of my application Ser. No. 194,311, filed Nov. 1, 1971 and now abandoned.

This invention relates to the cutting of "blind" slots in workpieces and, more particularly to the cutting of such slots having arcuate shape.

BACKGROUND OF THE INVENTION

When a slot or groove in a workpiece does not extend to the outside edge of the workpiece, it is often referred to as a "blind" slot. The manufacture of such slots is more difficult than forming slots or grooves which continue through a workpiece to at least one of its edges because it becomes necessary that all cutting and infeed of the cutting tool relative to the workpiece must occur within the limited confines of the slot area. To manufacture such blind slots, it is common to drill access holes in the workpiece at the beginning and end positions of the desired slot to provide effective edges at which cutting can start and finish, and the tools used for this type of slot cutting are usually routers, or end mills. Also, it is believed that blind slots may have been cut heretofore with specialized types of face-mill cutters which are reciprocated back and forth in the path defined by the access holes. In any event, because of the difficulty of carrying out cutting operations in such confined space, and because of the nature of the tools normally used for this operation, the cutting of blind slots is relatively slow and inefficient and, therefore, is avoided when at all possible in the design of machinery.

While the rotary combustion ("Wankel") engine has been known for several years, only recently has it come into commercial acceptance. While this type of engine uses considerably fewer parts than the conventional reciprocating piston engine, the manufacture of some of its parts, such as its rotors, is relatively expensive, and one of the major costs in making such rotors is related to the problem of cutting seats for the rotor seals which are equivalent to piston rings in reciprocating engines. The seats for the rotor seals are preferably "blind" slots, and because of the accuracy and finish required for these slots, their manufacture by the prior art methods and apparatus referred to above is proving to be quite expensive and slow. The invention herein is directed to the solution of this problem and provides a novel method and apparatus by which arcuate blind slots, such as those required for the rotors of rotary cumbustion engines, may be cut in an accurate efficient, and relatively inexpensive manner. It is believed that the method and apparatus disclosed herein permit such blind slots to be manufactured many times faster than is presently possible with known prior art means.

SUMMARY OF THE INVENTION

According to the invention herein, blind slots are cut by using a continuously rotating cutter head carrying a plurality of individual blades positioned in its face surface at equal angular spacings on a radius chosen according to the arc desired for the slot to be cut. Each individual cutter blade is controlled to extend axially, relative to the face surface of the cutter head, when aligned with the access hole in the workpiece defining one end of the slot and, similarly, each respective blade is withdrawn, i.e., retracted relative to the face surface of the cutter head, after it has traversed the full slot length, namely, when the blade enters the access hole defining the other end of the slot. In this manner, each blade, respectively, "pops out" of the cutter head the same distance relative to the face of the cutter, and the entire cutting apparatus is fed axially toward the work until the tips of the blades reach the desired slot depth, at which time the cutter remains in this full depth position long enough to permit the entire slot to be cut to full depth.

In the preferred apparatus disclosed herein, the blades are mounted for axial movement in a cutter head fixed to a machine spindle of the well-known type which both rotates on its axis and also moves axially to feed the cutter into the work. The cutter head and blades rotate with the spindle. In the preferred form of the invention, the means utilized to control the axial movement of the blades into and out of the slot being cut includes a ring-shaped face cam which is mounted to the spindle on appropriate bearings which, while permitting the cam to move axially with the spindle, prevent its rotation therewith.

Each such axially-movable cutter blade support is constantly biased toward its extended, i.e., "cutting," position. Each such blade-holding support also includes a cam follower which rolls along the surface of the face cam and is controlled thereby, being moved either to an extended cutting position or to a retracted or non-cutting position. The ramps of the face cam are arranged to coincide with the access holes drilled in the workpiece, thereby permitting each respective blade to be extended into the beginning access hole for cutting and then retracted when it reaches the access hole defining the end of the desired slot. It should be noted that the invention contemplates the cutting of slots as narrow as 0.060" while utilizing access holes as small as 0.40" in diameter.

A preferred embodiment of the blade control means includes hydraulic pistons which urge, i.e., "bias", each blade-holding means toward the cam surface. The blade-holding means are controlled by two pairs of cam ramps and each blade is generally maintained in its fully extended position. Just prior to its approach to the leading edge of the workpiece, the first ramp pair first retracts and then quickly extends each blade-holding means into the beginning pilot hole. At the end of the cutting traverse of the slot, the second ramp pair retracts the blade and then, after it passes beyond the trailing edge of the workpiece, extends it once again. These up-then-back-down blade movements provide a means whereby the response time of the hydraulic system can be increased greatly, permitting extremely rapid extension and contraction of the cutting blades. This improved response time is achieved by fixing the relative position of the extending and retracting cam ramps of each pair such that the relative distance between them is substantially equal to the spacing between the cutter blades. Therefore, as one blade begins movement to its extended position another blade will begin movement to its retracted position, thereby retaining a volumetric constancy in the hydraulic system.

The ramps of the first pair, provided for controlling the approach to the workpiece, are fixed relatively so that the blade being moved to its retracted position is not quite fully retracted at the moment when the blade being extended rapidly into the workpiece reaches its fully extended position. This results in a momentary surge of hydraulic pressure which acts to minimize any possible "bounce" by the extended blade.

DETAILED DESCRIPTION

The method and apparatus of the invention will now be described in greater detail with reference being made to the accompanying drawings in which.

Figure 2:
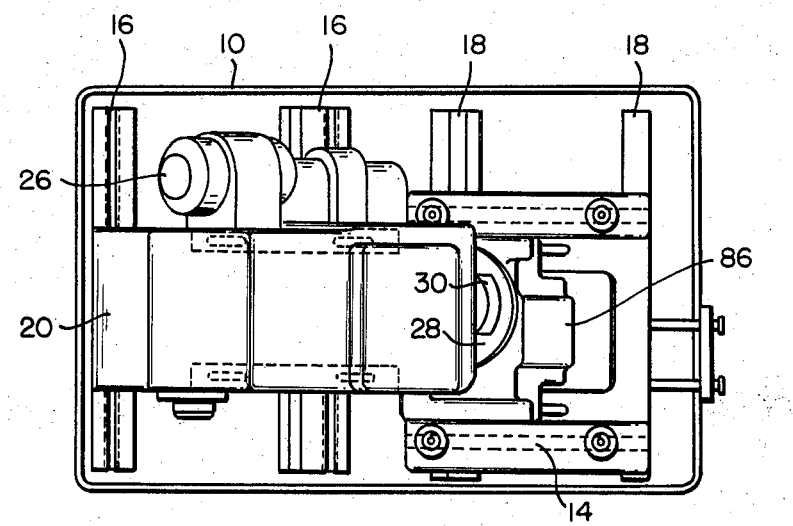
FIGS. 1 and 2 show elevation and plan views, respectively, of a preferred type of machine which can be used to practice the method of the invention.
Figure 1:
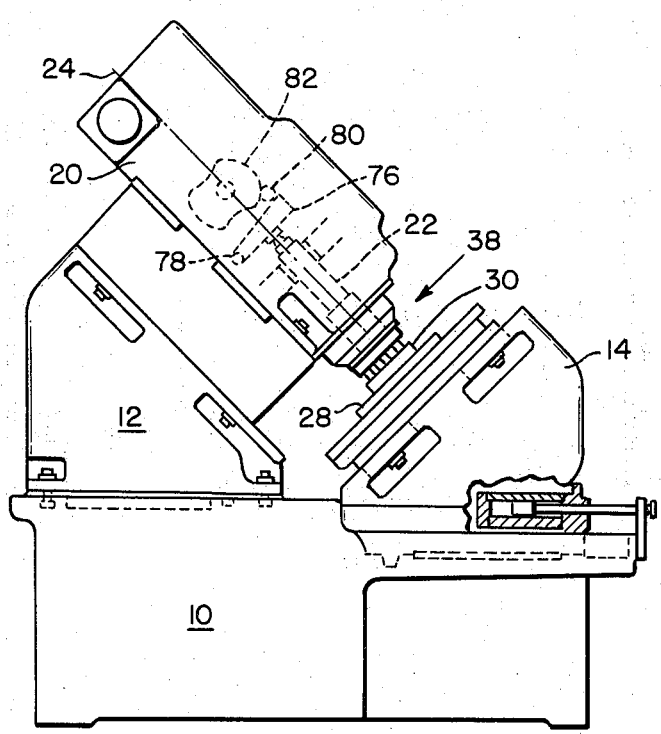

Referring to FIGS. 1 and 2, the machine according to the invention herein comprises a frame 10 which carries a tool head 12 and a work head 14, each mounted on appropriate slides 16 and 18, respectively, for relative adjustment thereon. Tool head 12 carries a spindle housing 20 in which a spindle 22 is mounted for rotation about axis 24. Spindle 22 is rotated by a drive motor 26 in a manner well known in the art. Spindle 22 is also movable axially, as will be explained in greater detail below.

Figure 3:
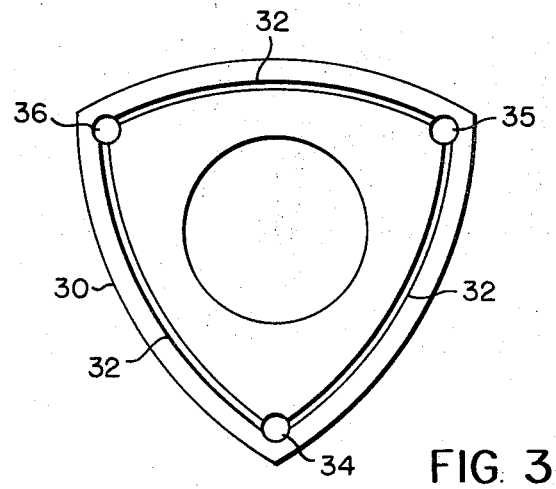
FIG. 3 is a schematic representation, in plan view, of a typical rotor for a rotary combustion engine, showing the access holes and arcuate blind slots required for holding rotor seals, the slots in such rotors being of the type contemplated for manufacture according to the invention herein.

Work head 14 carries a rotatable work support 28 which includes suitable means (not shown) for clamping and positioning a workpiece 30 relative to spindle 22. As can be seen from FIG. 3, for purposes of this disclosure workpiece 30 will be considered to be a typical delta-shaped rotor for a rotary combustion engine. In FIG. 3, the rotor is shown schematically as it would appear following the operations of the machine disclosed herein, namely, with blind seal slots 32 interconnecting access holes 34, 35, and 36.

Figure 5:
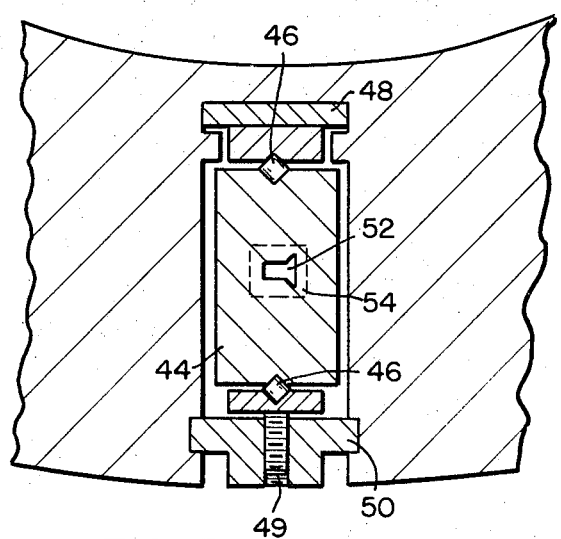
FIG. 5 is a schematic plan view showing the preferred mounting of a blade-holding element.
Figure 4:
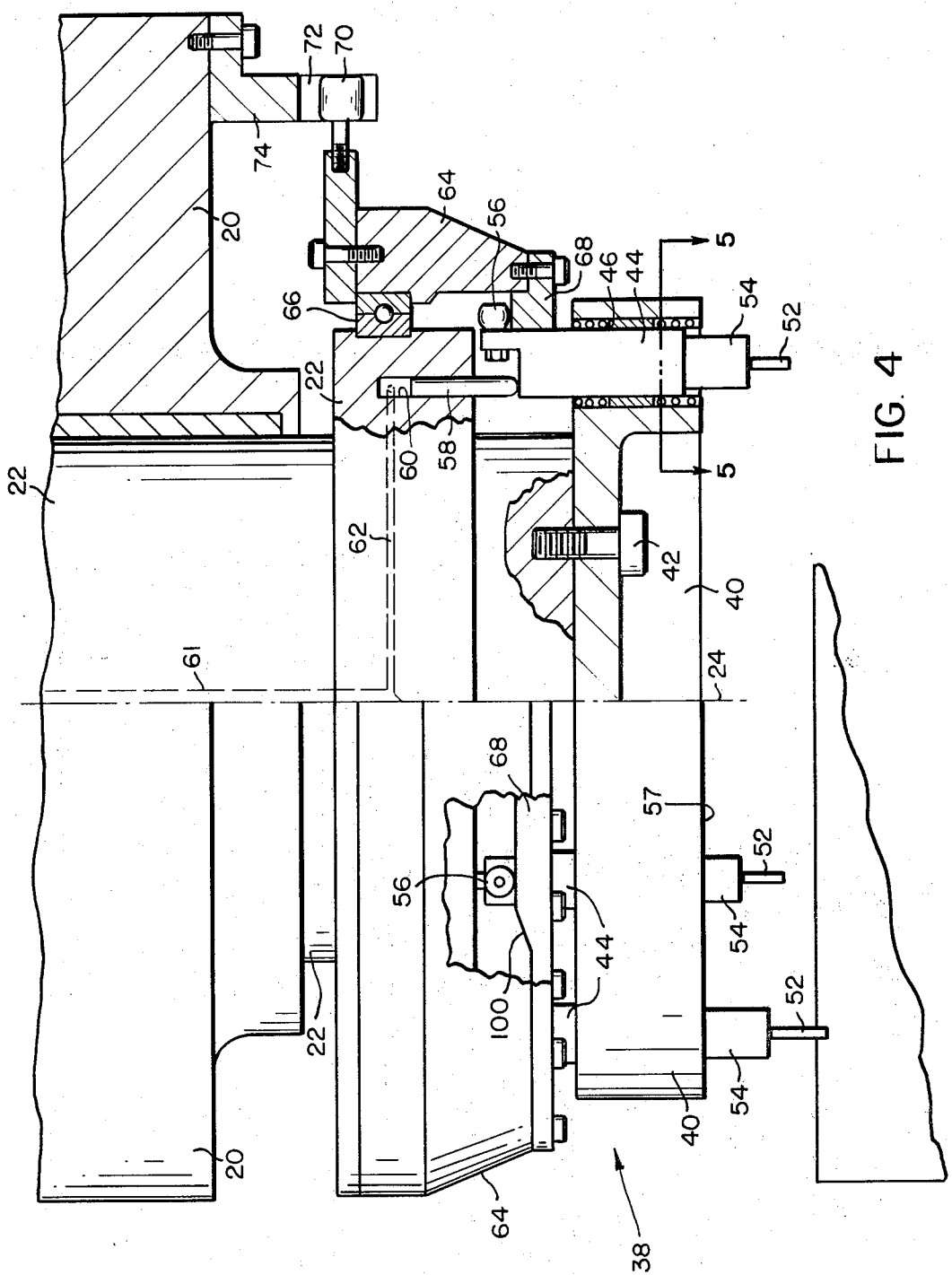
FIG. 4 is a partial elevation and partial cross sectional view of the cutting apparatus of the invention with all but three blade-holding means being omitted for clarity and with a portion of the elevation view being opened to show part of the face cam used to control extension and retraction of the cutting blades.

Connected to the end of spindle 22 is a cutter apparatus 38 disclosed in more detail in FIG. 4. A cutter head 40 is suitably attached to the face of spindle 22 by bolts 42. Carried in the cutter head are a plurality of blade-holding elements 44. While only three such blade elements are shown in FIG. 4 for the sake of clarity, it will be understood that the actual cutter head can be designed to carry up to 30 or more blades, depending upon its diameter. As can be seen in FIGS. 4 and 5, each blade-holding element 44 is mounted in the head for movement in a direction parallel to spindle axis 24 by means of suitable anti-friction bearings 46. A shim 48, in combination with set screws 49 in T-cap 50, permits radial adjustments for each blade-holding element 44.

Conventional means (not shown in detail) receive cutting blade 52 at the blade-carrying end 54 of each element 44. At the opposite end of each blade-holding element 44 is a cam-following roller 56. Each blade-holding element 44 is biased toward an extended position relative to the face surface 57 of cutter head 40 by a respective piston 58 each of which is suitably mounted in the end of spindle 22 in an appropriately spaced angular position. Each piston 58 is biased against the rear of its respective blade-holding element 44 by hydraulic or pneumatic means delivered to its respective cylinder 60 through appropriate conduits 61 and 62 formed in spindle 22. The features of this fluid pressure biasing system are described in greater detail below.

A support ring 64 is mounted to spindle 22 by means of ball bearings 66, and attached to the outer end of support ring 64 is a face cam 68. Pistons 58 maintain each blade-holding element 44 so that its cam-following roller 56 engages the surface of face cam 68, and it is cam 68 which controls the extension and retraction of each respective blade 52.

While support ring 64 is mounted on spindle 22 and follows the spindle's axial movement, it is prevented from rotating with spindle 22 by a roller 70 which is attached to the rear surface of support ring 64 and is received in a slot 72 in a bracket 74 fixed to the spindle housing 20. In this manner, it can be seen that support ring 64 and its face cam 68 can be fixed angularly relative to spindle housing 20 and, therefore, can be fixed angularly relative to workpiece 30 when the latter is secured to work support 28. However, while slot 72 of bracket 74 retains roller 70 to prevent angular movement of support ring 64, roller 70 is free to move vertically within slot 72, thereby permitting support ring 64 to move axially with spindle 22.

Axial movement of the spindle is controlled in a manner well known in the art and shown schematically in FIG. 1. Spring means (not shown) bias the spindle 22 against one side of a lever 76 pivotally mounted at one end to a shaft 78. A cam follower 80 attached to the opposite end of lever 76 engages a control cam 82. In the preferred form of the invention, cam 82 is designed so that spindle 22 is caused (a) to move gradually in an axial direction toward workpiece 30 to provide the desired infeed of cutting apparatus 38, (b) to dwell at its full depth position to assure that the entire slot has been cut to full depth, and then (c) to move rapidly in the opposite axial direction to withdraw cutting apparatus 38 out of engagement with workpiece 30 following completion of the cutting cycle.

As noted above, certain items were omitted from FIG. 4 to facilitate the explanation of the apparatus disclosed therein. The preferred design used to control the extension and retraction of the blades will now be described in greater detail with reference being made to FIG. 6 which is a schematic diagram illustrating, in simplified and two-dimensional form, the essential features of the cam-and-hydraulic control system. As described above, each cutting blade 52 is received in the blade-carrying end 54 of each of the respective blade-holding elements 44 which carry a cam-following roller 56 at the opposite end thereof. Each blade-holding element 44 is biased at all times towards its extended position by a piston 58 under fluid pressure supplied to a respective cylinder 60. This bias forces cam-following roller 56 into contact with the surface of face cam 68.

Figure 6:
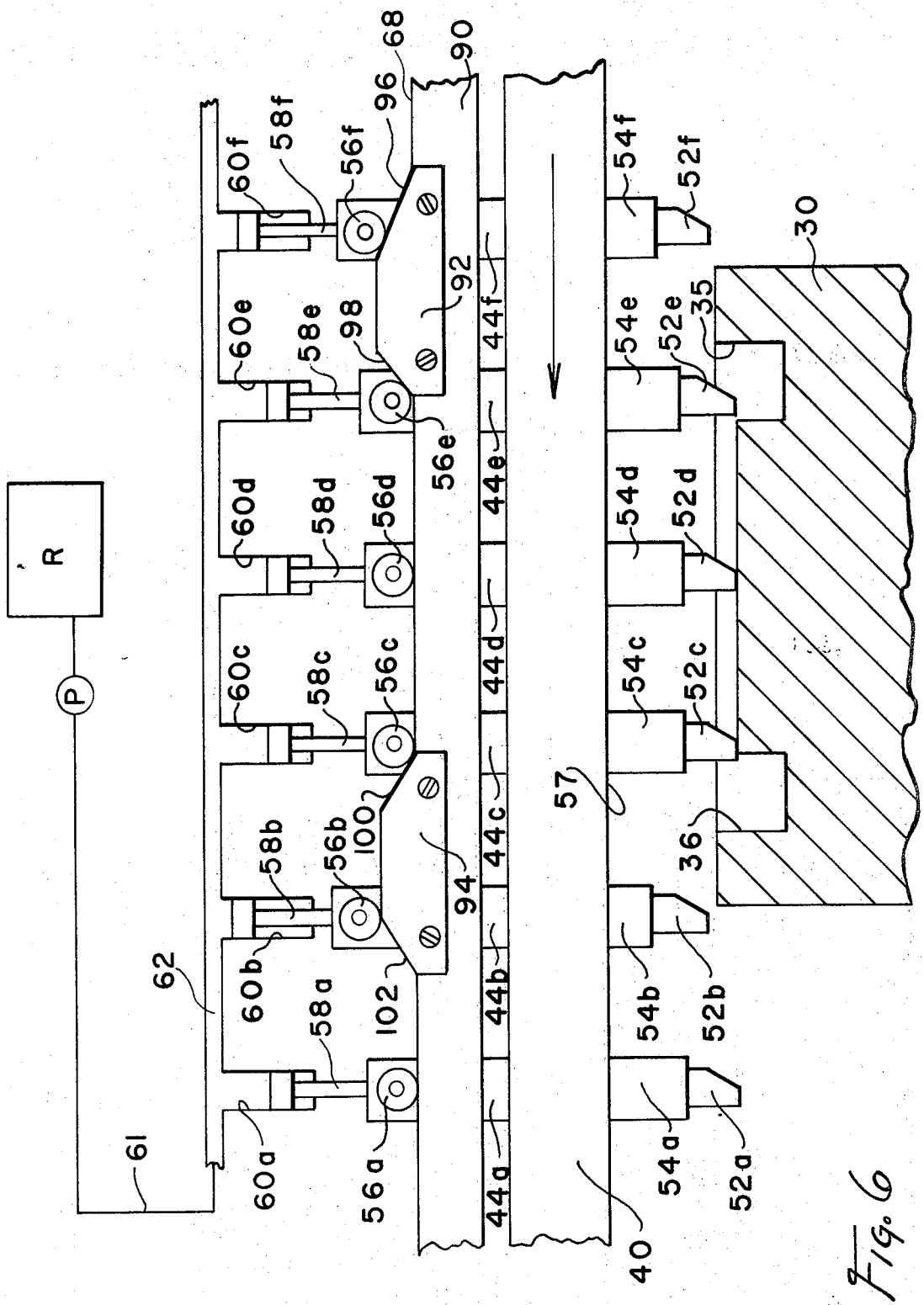
FIG. 6 is a schematic view of the preferred design for the blade-controlling cam and hydraulic bias system.

In FIG. 6, a cutter segment including six such biased cutting elements is shown, the various components of each of the respective cutting elements being differentiated by the subscripts $a$ through $f$. Hydraulic fluid from a reservoir R is delivered under pressure created by a pump through conduits 61 and 62 to the cylinders 60 which, as noted above, are positioned in angularly spaced relationships around the axis of the machine spindle.

Face cam 68 comprises a ring-shaped cam track 90 and two adjustable ramp units 92 and 94 which can be positioned as desired along the track and secured thereto in some appropriate manner, such as by screw-type elements. As noted above with reference to FIG. 4, face cam 68 is fixed to the outer end of support ring 64 which does not turn with spindle 22, while cutter head 40 is fixed to the spindle and rotates therewith. For purposes of the following explanation, it will be assumed that cutter head 40 is rotating in the direction of the arrow in FIG. 6, carrying with it the plurality of blade elements whose cam-following rollers 56 roll along the surface of face cam 68. As each cam-following roller 56 reaches the first ramp unit 92, it is first driven upward by blade-retracting ramp 96 and then, shortly thereafter, it moves down to its cutting position along blade-extending ramp 98. The cutting elements move similarly up and down over retracting ramp 100 and extending ramp 102 of ramp unit 94.

As each follower 56 arrives at ramps 98 and 102, it is suddenly "popped out" to its extended cutting position, and when each follower 56 arrives at ramp portion 96 and 100, it is suddenly withdrawn to its non-cutting position. Ramp units 92 and 94 are so designed that the difference between the extended and retracted positions of each blade is greater than the depth of the slot being cut. Also, the slopes of the ramps are designed to permit each blade 52 to move axially a distance equivalent to the full depth of the slot in less time than it takes a blade to cross an access hole 35 or 36. In this way, each successive blade pops into access hole 35 to begin its cutting engagement with workpiece 30 and then withdraws at the instant it reaches access hole 36. In this regard, it should be noted that the slope of extending ramp portion 98 must necessarily be steeper than the slope of retracting ramp portion 100 since the retracting blade can be raised as soon as its leading edge has entered access hole 36, using the full width of the access hole during retraction, while the extending blade cannot be moved to its full-depth cutting position until such time as its trailing edges have cleared the leading edge of access hole 35.

It can be appreciated that the invention herein can be practiced with a face cam which merely includes one extending ramp 98 and one retracting ramp 100 for each slot being cut. However, to achieve extremely high speed operation, the preferred embodiment of the invention utilizes the two pairs of ramps disclosed in FIG. 6. When only a single extending ramp portion and a single retracting ramp portion are used, the retracting piston (such as 58c in FIG. 6) must move a column of fluid extending from its cylinder 60c all the way back through conduits 62 and 61 to pump P or at least to some relatively remote accumulator. Similarly, when piston 58e moves down ramp 98, fluid must effectively move from pump P through conduits 61 and 62 into cylinder 60e. If the fluid must be moved over such relatively long paths, relatively slow hydraulic response results. This problem is overcome by the two pairs of ramps used in the preferred embodiment in combination with conduit 62 which, as shown, provides a fluid flow path between adjoining blade-holding means.

Referring first to the special design of ramp unit 94, ramps 100 and 102 are designed to be exactly the same length and are positioned relative to each other at a distance substantially equal to the spacing between each successive blade. Therefore, at the exact instant that follower 56c arrives at the beginning of retracting ramp portion 100 and piston 58c begins to reduce the volume of liquid in cylinder 60c, follower 56b arrives at the beginning of extending ramp portion 102 and piston 58b begins to increase the volume of liquid in cylinder 60b. Therefore, it is not necessary for piston 58c to push a long column of fluid through conduits 62 and 61 back to the pump. Instead, the fluid being moved out of piston 60c can flow immediately through interconnecting conduit 62 into nearby piston 60b. Since the length of the path through which the fluid must move is relatively short, the response time of the hydraulic system is greatly reduced.

Ramp unit 92 is designed to use the same general principle of maintaining substantially constant volume in the hydraulic system and of providing a relatively short path for fluid movement to permit faster response times. However, ramp unit 92 varies somewhat from unit 94 in that extending ramp 98 is steeper and shorter than retracting ramp 96. The steepness of the slope of extending ramp 98, is, as noted above, dictated by the size of pilot hole 35 and by the width and expected maximum angular velocity of each cutter blade 52. On the other hand, ramp 96 can be less steep, and this is particularly desirable in order to save wear on the cam-following rollers.

The slightly greater length of ramp 96 as compared to ramp 98 is also intended to provide an additional salutary effect. Due to the steepness of ramp 98 and the speed at which cutter head 30 revolves, the extending motion of blade-holding element 44e is quite rapid, and in order to minimize the tendency for the suddenly-extended element to bounce back from its cutting position, ramp unit 92 is designed so that the distance between the ends of ramps 96 and 98 is slightly greater than the spacing between successive blades. Therefore, at the instant cam-following roller 56e reaches the end of extending ramp portion 98, follower 56f has not quite reached the end of retracting ramp portion 96, and so at this moment piston 58f is still reducing the volume of fluid in cylinder 60f. Since cylinder 60e is already at full volume, the final movement of piston 58f creates a pulse of back pressure in the hydraulic system which is applied through interconnecting conduit 62 to piston 58e at the time it reaches its fully-extended cutting position, thereby helping to overcome any tendency that follower 56e may have to bounce.

While the hydraulic-balancing feature has just been described relating the distance between the ramps of an associated pair to the spacing between successive blade, it will be readily appreciated that this same effect can be achieved so long as the distance between the ramps is equivalent to a multiple of the blade spacing. Of course, the shorter the distance between the retracting and extending pistons, the shorter the fluid flow path and the faster the response time of the cutting units.

Also, it should be noted that wear on cam-following rollers 56 can be reduced by providing each blade-holding element 44 in cutter head 40 with suitable stop means to determine the maximum extended position for each blade. With such an arrangement, it would not be necessary for rollers 56 to make actual contact with the surface of cam track 90 when in their normally extended positions. In such an arrangement, rollers 56 would only engage the cam surfaces of ramp units 92 and 94, thereby minimizing roller wear.

Operation of the novel apparatus just described in detail above is as follows: A workpiece 30, such as that shown in FIG. 3, is first prepared by the drilling of three properly spaced access holes 34, 35 and 36. Workpiece 30 is then clamped to work support 28 (FIG. 1). The cutting apparatus is set up so that each blade 52 in cutter head 40 is spaced radially from axis 24 so that it moves along an arcuate path having the radius desired for slot 32. (Note: A typical radius for such slots may be around 9".) Assuming that the uppermost slot shown in FIG. 3 is to be cut, cam ring 64 is positioned angularly relative to spindle housing 20, work support 28, and workpiece 30 such that the distance between the end of extending ramp 98 and the beginning of retraction ramp 100 coincides with the angular position of that portion of workpiece 30 in which the blind slot is to be cut, namely, so that ramps 98 and 100 coincide exactly with access holes 35 and 36, respectively.

As cutter head 40 rotates with spindle 22, each respective blade-holding element 44 moves with head 40, causing each respective cam-following roller 56 to roll sequentially along the cam surfaces of ramp units 92 and 94 to extend each successive blade into hole 35 to begin its cutting engagement with workpiece 30 and thereafter to withdraw each blade at the instant it reaches access hole 36.

As cutter head 40 rotates, spindle 22 is gradually moved axially toward workpiece 30 by the cam drive mechanism referred to above. In this manner, the blades which are cutting in the slot (there may be one or more blades extended and cutting at any one time) are gradually fed into the slot until full depth is reached. It will be appreciated that each cutting blade is actually moving deeper into the slot while it is cutting during this in-feed portion of the cycle and, therefore, in order to assure that the full length of the slot is cut to full depth, it is necessary that the cutter head remain at its full depth position for a time equivalent to that required for at least one blade to pass completely through the slot.

After the slot is completed in the manner just described, the cutting apparatus is withdrawn and work support 28, carrying workpiece 20 with it, is rotated 120° by an index mechanism 86 (not shown in detail) in a manner well known in the art. This now aligns access holes 34 and 35 of workpiece 30 with the ramps of cam 68, and the cutting mechanism is then gradually fed into the workpiece once again in the manner just described above. This same indexing and cutting operation is repeated once more to cut the third slot between access holes 36 and 34, thereby completing the cutting of three arcuate blind slots 32 in workpiece 30.

While the invention herein has been described in relation to one particular machine format, it will be appreciated by those skilled in the art that the cutting apparatus disclosed herein can be readily adapted to any number of machine formats which include well known rotatable and axially movable spindle means. The cutter-carrying spindle of the machine can be vertically or horizontally oriented or, as shown herein, be positioned in some other orientation to meet the requirements of practice. Therefore, it will be understood that the apparatus disclosed herein represents only one possible machine embodiment and that the method disclosed herein might be carried out with other apparatus as well.

What is claimed is:

1. Apparatus for use with a machine having rotatable and axially movable spindle means to cut a blind slot in a workpiece in which an access hole has been drilled at the beginning and end, respectively of the proposed slot, said apparatus including cutter-head means adapted to be fixed to said spindle means for rotation and axial movement therewith and having a plurality of blades each mounted in a respective blade-holding means arranged radially about a face surface at equal angular spacings, and control means, including cam means, for sequentially extending and retracting each blade-holding means relative to the face surface of the cutter-head means at predetermined angular positions during its rotation so that each blade is sequentially extended relative to the face of the cutter-head means into the beginning hole to cuttingly engage the workpiece and thereafter is sequentially retracted relative to the face of the cutter-head means to a position out of engagement with the workpiece while the blade is passing through said end hole, said apparatus being characterized in that said control means comprises:

fluid pressure means for normally urging each blade-holding means toward its extended position relative to the face surface of the cutter-head means and for biasing each blade-holding means into engagement with the cam means, and said cam means includes at least one cam ramp means having an extending ramp portion and a retracting ramp portion wherein the beginning of said ramp portions are fixed relative to each other a distance substantial'y equal to a multiple of the spacing between adjoining blade-holding means so that, when one blade-holding means engages the beginning of the extending ramp portion, another blade-holding means engages the beginning of the retracting ramp portion, said fluid pressure means also including conduit means for forming a fluid flow path between adjoining blade-holding means so as to provide a rapid response of the fluid pressure means to the movements of blade-holding means engaging the ramp portions of said cam ramp means.

2. Apparatus according to claim 1 wherein said cam means includes two cam ramp means and wherein the slope of the extending ramp portion of one cam ramp means is steeper than the extending ramp portion of the other cam ramp means.

3. Apparatus according to claim 1 wherein the extending and retracting portions of said cam ramp means are substantially equal.

4. Apparatus according to claim 1 wherein said extending ramp portion is steeper than said retracting ramp portion so that, when one blade-holding means reaches the end of the extending ramp portion, another blade-holding means has not quite reached the end of the retracting ramp portion.

5. Apparatus according to claim 1 wherein said cam ramp means comprises a unitary cam element.

6. Apparatus according to claim 5 wherein said unitary cam element is adjustable angularly relative to said cutter-head means.

7. Apparatus according to claim 6 wherein said cam means also includes a ring-shaped cam track adapted to be movable axially with said spindle means but held against rotation herewith and said unitary cam element is adjustable angularly along said track.

* * * * *